(12) United States Patent
Nagesh et al.

(10) Patent No.: US 10,126,025 B2
(45) Date of Patent: Nov. 13, 2018

(54) MAGNETO CALORIC ASSEMBLIES

(71) Applicant: GENERAL ELECTRIC COMPANY, Schenectady, NY (US)

(72) Inventors: Mamatha Nagesh, Bangalore (IN); Atanu Saha, Bangalore (IN); Francis Johnson, Clifton Park, NY (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 171 days.

(21) Appl. No.: 14/904,961

(22) PCT Filed: Jul. 24, 2014

(86) PCT No.: PCT/US2014/047925
§ 371 (c)(1),
(2) Date: Jan. 14, 2016

(87) PCT Pub. No.: WO2015/017230
PCT Pub. Date: Feb. 5, 2015

(65) Prior Publication Data
US 2016/0161156 A1    Jun. 9, 2016

(30) Foreign Application Priority Data

Aug. 2, 2013 (IN) .......................... 3486/CHE/2013

(51) Int. Cl.
*F25B 21/00* (2006.01)

(52) U.S. Cl.
CPC ........ *F25B 21/00* (2013.01); *F25B 2321/002* (2013.01); *F25B 2321/0023* (2013.01); *Y02B 30/66* (2013.01)

(58) Field of Classification Search
CPC ............. Y02B 30/66; F25B 2321/0023; F25B 2321/002; F25B 21/00
See application file for complete search history.

(56) References Cited

U.S. PATENT DOCUMENTS

| 668,560 | A | 2/1901 | Fulner et al. |
|---|---|---|---|
| 4,107,935 | A | 8/1978 | Steyert, Jr. |
| 4,200,680 | A | 4/1980 | Sasazawa et al. |
| 4,507,927 | A | 4/1985 | Barclay |
| 4,549,155 | A | 10/1985 | Halbach |

(Continued)

FOREIGN PATENT DOCUMENTS

| CA | 2893874 A1 | 6/2014 |
|---|---|---|
| CA | 2919117 A1 | 1/2015 |

(Continued)

OTHER PUBLICATIONS

Journal of Alloys and Compounds, copyright 2008 Elsevier B. . . V . . . .

(Continued)

*Primary Examiner* — Ana Vazquez
(74) *Attorney, Agent, or Firm* — Dority & Manning, P.A.

(57) ABSTRACT

A magneto-caloric assembly can include a first region including a first magneto-caloric material, a second region disposed on the first region and including a second magneto-caloric material and a first matrix material, and a third region disposed on the second region and including a thermally conductive material.

17 Claims, 3 Drawing Sheets

(56) References Cited

U.S. PATENT DOCUMENTS

| | | | |
|---|---|---|---|
| 4,625,519 A | 12/1986 | Hakuraku et al. | |
| 4,642,994 A | 2/1987 | Barclay et al. | |
| 4,785,636 A | 11/1988 | Hakuraku et al. | |
| 4,796,430 A | 1/1989 | Malaker et al. | |
| 5,091,361 A | 2/1992 | Hed | |
| 5,156,003 A | 10/1992 | Yoshiro et al. | |
| 5,249,424 A | 10/1993 | DeGregoria et al. | |
| 5,336,421 A | 8/1994 | Kurita et al. | |
| 5,351,791 A * | 10/1994 | Rosenzweig | B60R 19/36 188/372 |
| 5,934,078 A | 8/1999 | Lawton, Jr. et al. | |
| 6,332,323 B1 | 12/2001 | Reid et al. | |
| 6,423,255 B1 | 7/2002 | Hoechsmann et al. | |
| 6,446,441 B1 | 9/2002 | Dean | |
| 6,588,215 B1 | 7/2003 | Ghoshal | |
| 6,668,560 B2 | 12/2003 | Zimm et al. | |
| 6,935,121 B2 | 8/2005 | Fang et al. | |
| 6,946,941 B2 | 9/2005 | Chell | |
| 7,313,926 B2 | 1/2008 | Gurin | |
| 7,481,064 B2 | 1/2009 | Kitanovski | |
| 7,552,592 B2 | 6/2009 | Iwasaki et al. | |
| 7,644,588 B2 | 1/2010 | Shin | |
| 7,897,898 B2 | 3/2011 | Muller et al. | |
| 8,099,964 B2 | 1/2012 | Saito et al. | |
| 8,174,245 B2 | 5/2012 | Carver | |
| 8,209,988 B2 | 7/2012 | Zhang et al. | |
| 8,375,727 B2 | 2/2013 | Sohn | |
| 8,378,769 B2 | 2/2013 | Heitzler et al. | |
| 8,448,453 B2 | 5/2013 | Bahl et al. | |
| 8,551,210 B2 | 10/2013 | Reppel | |
| 8,596,084 B2 | 12/2013 | Herrera | |
| 8,616,009 B2 | 12/2013 | Dinesen | |
| 8,656,725 B2 | 2/2014 | Muller et al. | |
| 8,695,354 B2 | 4/2014 | Heitzler et al. | |
| 8,729,718 B2 | 5/2014 | Kuo et al. | |
| 8,769,966 B2 | 7/2014 | Heitzler et al. | |
| 8,869,541 B2 | 10/2014 | Heitzler et al. | |
| 8,935,927 B2 | 1/2015 | Kobayashi et al. | |
| 9,245,673 B2 | 1/2016 | Carroll | |
| 9,377,221 B2 | 6/2016 | Benedict | |
| 2003/0051774 A1 | 3/2003 | Saito | |
| 2004/0093877 A1 | 5/2004 | Wada | |
| 2004/0250550 A1 | 12/2004 | Bruck | |
| 2005/0109490 A1 | 5/2005 | Harmon et al. | |
| 2006/0231163 A1 | 10/2006 | Hirosawa | |
| 2008/0236171 A1 | 10/2008 | Saito et al. | |
| 2008/0303375 A1* | 12/2008 | Carver | H01L 37/00 310/306 |
| 2009/0158749 A1 | 6/2009 | Sandeman | |
| 2009/0217674 A1 | 9/2009 | Kaji et al. | |
| 2010/0000228 A1 | 1/2010 | Wiest | |
| 2010/0071383 A1 | 3/2010 | Zhang | |
| 2010/0116471 A1 | 5/2010 | Kobayashi | |
| 2010/0209084 A1 | 8/2010 | Nelson et al. | |
| 2010/0276627 A1 | 11/2010 | Mazet | |
| 2011/0042608 A1 | 2/2011 | Reesink | |
| 2011/0048031 A1 | 3/2011 | Barve | |
| 2011/0048690 A1 | 3/2011 | Reppel | |
| 2011/0058795 A1 | 3/2011 | Kleman et al. | |
| 2011/0082026 A1 | 4/2011 | Sakatani et al. | |
| 2011/0168363 A9 | 7/2011 | Reppel | |
| 2011/0182086 A1 | 7/2011 | Mienko et al. | |
| 2011/0192836 A1 | 8/2011 | Muller et al. | |
| 2011/0239662 A1 | 10/2011 | Bahl et al. | |
| 2011/0302931 A1 | 12/2011 | Sohn | |
| 2011/0308258 A1 | 12/2011 | Smith et al. | |
| 2012/0031108 A1 | 2/2012 | Kobayashi et al. | |
| 2012/0033002 A1 | 2/2012 | Seeler | |
| 2012/0045698 A1 | 2/2012 | Shima | |
| 2012/0079834 A1 | 4/2012 | Dinesen | |
| 2012/0222427 A1 | 9/2012 | Hassen | |
| 2012/0222428 A1 | 9/2012 | Celik | |
| 2012/0267090 A1 | 10/2012 | Kruglick | |
| 2012/0272666 A1 | 11/2012 | Watanabe | |
| 2012/0285179 A1 | 11/2012 | Morimoto | |
| 2012/0291453 A1 | 11/2012 | Watanabe et al. | |
| 2013/0019610 A1 | 1/2013 | Zimm et al. | |
| 2013/0180263 A1 | 7/2013 | Choi et al. | |
| 2013/0187077 A1 | 7/2013 | Katter | |
| 2013/0192269 A1 | 8/2013 | Wang | |
| 2013/0199460 A1 | 8/2013 | Duplessis et al. | |
| 2013/0227965 A1 | 9/2013 | Yagi et al. | |
| 2013/0232993 A1 | 9/2013 | Saito et al. | |
| 2013/0269367 A1 | 10/2013 | Meillan | |
| 2013/0298571 A1 | 11/2013 | Morimoto et al. | |
| 2014/0020881 A1 | 1/2014 | Reppel | |
| 2014/0116538 A1 | 5/2014 | Tanaka et al. | |
| 2014/0165594 A1 | 6/2014 | Benedict | |
| 2014/0165595 A1 | 6/2014 | Zimm et al. | |
| 2014/0190182 A1 | 7/2014 | Benedict | |
| 2014/0216057 A1 | 8/2014 | Oezcan | |
| 2014/0290273 A1 | 10/2014 | Benedict et al. | |
| 2014/0290275 A1 | 10/2014 | Muller | |
| 2014/0291570 A1 | 10/2014 | Klausner | |
| 2014/0305137 A1 | 10/2014 | Benedict | |
| 2014/0325996 A1 | 11/2014 | Muller | |
| 2015/0007582 A1 | 1/2015 | Kim et al. | |
| 2015/0027133 A1 | 1/2015 | Benedict | |
| 2015/0033762 A1 | 2/2015 | Cheng | |
| 2015/0033763 A1 | 2/2015 | Saito | |
| 2015/0047371 A1 | 2/2015 | Hu et al. | |
| 2015/0068219 A1 | 3/2015 | Komorowski | |
| 2015/0114007 A1 | 4/2015 | Neilson et al. | |
| 2015/0168030 A1 | 6/2015 | Leonard et al. | |
| 2015/0260433 A1 | 9/2015 | Choi | |
| 2015/0362225 A1 | 12/2015 | Schwartz | |
| 2016/0355898 A1 | 12/2016 | Vieyra | |
| 2017/0071234 A1 | 3/2017 | Garg | |

FOREIGN PATENT DOCUMENTS

| | | |
|---|---|---|
| CN | 101979937 | 10/2010 |
| CN | 101788207 B | 9/2011 |
| CN | 202432596 U | 9/2012 |
| CN | 103090583 A | 5/2013 |
| CN | 102077303 B | 4/2015 |
| DE | 102013223959 A | 5/2015 |
| EP | 2071255 A1 | 6/2009 |
| EP | 2108904 A1 | 10/2009 |
| FR | 2935468 A1 | 3/2010 |
| JP | S59232922 | 12/1984 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| KR | 101100301 B1 | 12/2011 |
| KR | 1238234 B1 | 3/2013 |
| WO | WO0212800 A1 | 2/2002 |
| WO | WO03016794 A1 | 2/2003 |
| WO | WO2004/068512 | 8/2004 |
| WO | WO2007/036729 A1 | 4/2007 |
| WO | WO2009/024412 | 2/2009 |
| WO | WO2011034594 A1 | 3/2011 |
| WO | WO2014173787 A1 | 10/2014 |

OTHER PUBLICATIONS

Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

International Search Report and Written Opinion issued in connection with PCT Applicaton No. PCT/US2013/070023 dated Mar. 6, 2014.

International Search Report and Written Opinion issued in connection with PCT Application No. PCT/US2014/042485 dated Oct. 31, 2014.

(56) References Cited

OTHER PUBLICATIONS

International Search Report and Written Opinion issued in connection with PCT Application No. PCT/US2014/017431 dated May 16, 2014.
International search report issued in connection with PCT/US2013/070518, dated Jan. 30, 2014.
Tetsuji Okamura, Performance of a room-temperature rotary magnet refrigerator, dated Nov. 28, 2005, Elsevier.
Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.

* cited by examiner

US 10,126,025 B2

MAGNETO CALORIC ASSEMBLIES

BACKGROUND

The invention relates to magneto-caloric materials, and more particularly to regenerators for magneto-caloric regeneration.

Conventional refrigeration technology has often utilized the adiabatic expansion or the Joule-Thomson effect of a gas. However, in case of such gas compression technology, a refrigerant material is used. Examples of such refrigerant materials may include a hydro-fluorocarbon (HFC), a hydro-chlorofluorocarbon (HCFC), or a chlorofluorocarbon (CFC) gas. If not disposed off properly, the refrigerant material may pose environmental challenges. Additionally, the gas compression technology is a mature technology and extracting additional energy savings out of this technology has proved difficult.

An alternative refrigeration technique involves a magnetic refrigeration method that uses entropy change accompanied by a magnetic or magneto-structural phase transition of a magneto-caloric material, referred to as a magnetic phase transformation. In the magnetic refrigeration technique, cooling is effected by using a change in temperature resulting from the entropy change of the magneto-caloric material. In particular, the magneto-caloric material used in the magnetic refrigeration method alternates between a low magnetic entropy state with a high degree of magnetic orientation created by applying a magnetic field to the magnetic material near a transition temperature (typically near Curie temperature) of the magnetic material, and a high magnetic entropy state with a low degree of magnetic orientation (randomly oriented state) that is created by removing the magnetic field from the magnetic material. Such a transition between high and low magnetic entropy states manifests as a transition between low and high lattice entropy states, in turn resulting in warming up or cooling down of the magneto-caloric material when exposed to magnetization and demagnetization. This is known as the "magneto-caloric effect." It is desirable to leverage the magneto-caloric effect present within certain magneto-caloric materials to develop a magnetic refrigerator.

Conventional magneto-caloric material based systems require heat exchangers (or regenerators) for heat transfer between the magneto-caloric material and the heat exchange fluid. Magneto-caloric materials include multiple alloys that are typically brittle and have a tendency to become powders due to inherent stress in the material. Moreover, magneto-caloric materials have low thermal conductivity and hence are less efficient when subjected to transient operating cycles due to cyclic magnetization and demagnetization. Conventional heat exchanger designs use porous bed structures that have a high pressure drop. Additionally, the porous bed structures are prone to erosion.

Further, during operation, regenerator components need to be in physical contact with organic or aqueous based coolants. Based on the nature of the coolant (acidic or basic), magneto-caloric materials of the regenerator components react with the coolant. For example, a magneto-caloric material when directly exposed to the aqueous heat exchange fluids reacts to form oxide or hydroxide layers on a surface of the magneto-caloric material, which in turn may lower the efficiency and reliability of the heat exchanger in magneto-caloric refrigeration systems. The oxides and/or hydroxides on the surface of the magneto-caloric materials may cause degradation in the heat transfer coefficient. With time, this oxide/hydroxide spalls from the magneto-caloric materials thereby causing enhanced resistance to fluid flow. Moreover, due to magnetic cycling, cracking followed by disintegration of the magneto-caloric materials is highly probable.

BRIEF DESCRIPTION

In one embodiment, a magneto-caloric assembly is provided. The assembly includes a first region comprising a first magneto-caloric material, a second region disposed on the first region and comprising a second magneto-caloric material and a first matrix material, and a third region disposed on the second region and comprising a thermally conductive material.

In another embodiment, a magneto-caloric assembly having a magneto-caloric material, a magneto-caloric composite material disposed on the magneto-caloric material, and a thermally conductive composite material disposed on the magneto-caloric composite material is provided.

In yet another embodiment, a magneto-caloric system configured for heat transfer between the magneto-caloric material and a heat exchange fluid is provided. The system includes a regenerator having a magneto-caloric assembly. The magneto-caloric assembly includes a first region, a second region and a third region. The system further includes a fluid path, a magnetic assembly and a fluid circuit. The fluid path is configured to exchange thermal energy between a heat exchange fluid and the magneto-caloric assembly. The magnet assembly is configured to generate magnetic flux that magnetize and de-magnetize the regenerator cyclically. The fluid circuit coupling a load, a sink, and the regenerator, wherein the heat exchange fluid facilitate exchange of thermal units between the load and the sink.

DRAWINGS

These and other features and aspects of embodiments of the invention will become better understood when the following detailed description is read with reference to the accompanying drawings in which like characters represent like parts throughout the drawings, wherein.

DETAILED DESCRIPTION

Typically, a magnetic-caloric system is based on an active magnetic regenerative (AMR) cycle. The AMR cycle uses magneto-caloric materials based heat exchangers, often referred to as regenerators, for heat transfer between a magneto-caloric material and a heat exchange fluid. Multiple layers of magneto-caloric materials with different Curie temperatures are used to achieve the temperature span. Embodiments disclosed herein, describe various aspects related to magneto-caloric materials, assemblies and systems.

In certain embodiments, components having magneto-caloric materials may need to be in physical contact with a coolant during operation. By way of example, such components may need to be in direct physical contact with organic or aqueous based coolants. Based on an acidic or basic nature of the coolant, the magneto-caloric materials may react with the coolant and form oxides and/or hydroxides, respectively, on a surface of the components, thereby causing degradation in the heat transfer coefficient. With time, these oxides/hydroxides may spall from the surface of the component, thereby causing enhanced resistance to fluid flow. Enhanced resistance to fluid flow may result in a build-up of back-pressure in the system. Further, due to magnetic cycles, cracking of the magneto-caloric material followed by mechanical disintegration of the magneto-caloric material is highly probable. In some embodiments, magneto-caloric assemblies of the present application display unexpected results by providing materials that can withstand both thermal and mechanical stresses during AMR cycles without substantial thermal and mechanical degradation of the magneto-caloric material.

Certain embodiments disclosed herein implement efficient regenerator designs that help optimize various system level parameters such as cooling temperature range, cooling rate, load, size, weight, cost and overall thermal efficiency. In certain embodiments, the magneto-caloric assemblies may be used in regenerators for magneto-caloric regeneration, where the magneto-caloric assemblies may facilitate enhanced thermal and mechanical stability of the components. Also, in one embodiment, the magneto-caloric assemblies may be configured to act as corrosion and erosion resistant coatings.

Figure 1:
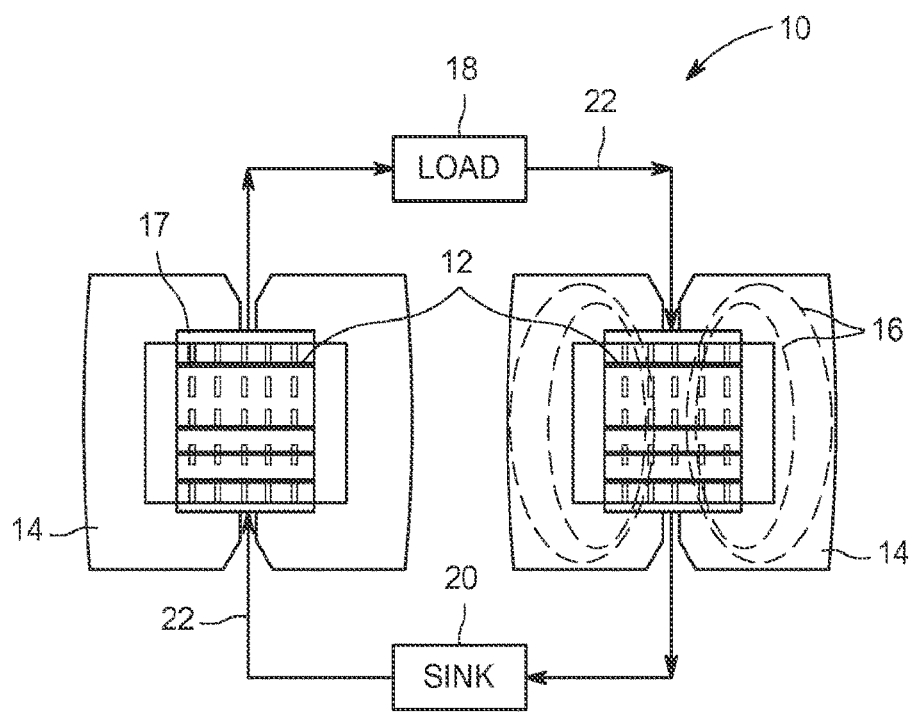
FIG. 1 is a schematic representation of an example magneto-caloric refrigeration system configured to provide cooling using a magneto-caloric effect, in accordance with aspects of the present disclosure.

Referring now to the drawings, FIG. 1 illustrates an example magneto-caloric refrigeration system 10 configured to provide cooling using the magneto-caloric effect. In the illustrated embodiment, the system 10 includes a regenerator 17 having a plurality of magneto-caloric elements 12. Each magneto-caloric element 12 includes magnetically aligned clusters of magneto-caloric assemblies. The cluster having miniature structures is arranged intimately such that gaps are formed between the miniature structures. A magnet assembly 14 is disposed around the regenerator 17. In one embodiment, the magnet assembly 14, for example, may include a permanent magnet or an electromagnet. The magnet assembly 14 may be configured to generate magnetic flux. In some embodiments, the magnetic flux may cyclically magnetize or demagnetize one or more of the plurality of magneto-caloric elements 12 within the regenerator. In the illustrated embodiment, the system 10 may also include a load 18 and a sink 20, where the load 18 and the sink 20 may be coupled through a fluid circuit 22. A fluid path formed within the gaps formed between the miniature structures in a cluster of the magneto-caloric material is coupled to the fluid circuit 22. A heat exchange fluid is configured to flow through the fluid path and fluid circuit 22.

In operation, the system 10 is configured to sequentially regulate the temperature of the plurality of magneto-caloric elements 12 within the regenerator 17. Advantageously, regulating the temperature of the magneto-caloric elements 12 may result in enhancing, and sometimes even maximizing, the magneto-caloric effect for each of the plurality of magneto-caloric elements 12 when subjected to a magnetic regenerative refrigeration cycle. In particular, the plurality of magneto-caloric elements 12 may be heated or cooled through isentropic magnetization or isentropic demagnetization (via magnetic field 16) and through transfer of heat using a fluid medium. In certain embodiments, the magneto-caloric elements 12 may be excited by a magnetic field 16 generated by the magnet assembly 14. Such excitation results in heating or cooling of the magneto-caloric elements 12. In some embodiments, the load 18 and the sink 20 may be thermally coupled to the magneto-caloric elements 12 in the regenerator 17. In some embodiments, the load 18 and the sink 20 may include a fluidic medium for transferring the heat between the magneto-caloric elements 12 and the environment. The fluidic medium facilitates exchange of thermal units between the load 18 and the sink 20 that in turn heats or cools the load 18. In one embodiment, the fluidic medium, for example, a heat exchange fluid may be configured to exchange thermal units with the magneto-caloric material. The magneto-caloric elements 12 may be designed for efficient exchange of thermal units with the fluidic medium.

In certain embodiments, heat exchange fluids in the magneto-caloric system 10 may have a low freezing point (also the lowest fluid temperature in the AMR cycle) and enhanced thermal properties. Further, the heat exchange fluids may be non-toxic and non-flammable. Thermal properties of the heat exchange fluid such as thermal conductivity, specific heat capacity, density and viscosity affect the thermal efficiency of the regenerator 17. It is desirable for any heat exchange fluid to have high specific heat capacity, high density, high thermal conductivity and low viscosity. Such properties improve the heat transfer coefficients for convection heat transfer in the regenerator 17 and reduce pumping losses. High specific heat capacity facilitates more heat being transferred between the magneto-caloric materials and the heat exchange fluid resulting in higher regenerator efficiency. Non-limiting examples of heat exchange fluids include Paratherm LR®, Multi-therm PG-1®, Syltherm® and Dowfrost®. Further, non-limiting examples of water based heat exchange fluids include Dynalene HC-30® and Dowcal®.

Chemical properties of magneto-caloric materials influence the design of regenerators. Rare earth based magneto-caloric materials may not be chemically compatible with the aqueous based heat exchange fluid. Such rare earth based magneto-caloric materials may react with aqueous based heat exchange fluids to form metal hydroxides and/or oxides on the surface of the regenerator 17. Since hydroxides and oxides have low thermal conductivities, the formation of the layer of oxides or hydroxides decreases heat transfer capability from the heat exchange fluid to the magneto-caloric material and vice versa, thereby decreasing the thermal efficiency of the regenerator 17. In certain embodiments, chemical compatibility of the magneto-caloric materials may be improved by disposing a protective layer that is thermally conducting and chemically inert. Such a protective layer may act as a barrier between the magneto-caloric material and the heat exchange fluid and protect the regenerator system from degradation. In some embodiments, physical isolation between the magneto-caloric material and the heat exchange fluid are disclosed to enhance the chemical properties of the magneto-caloric materials.

Figure 2:
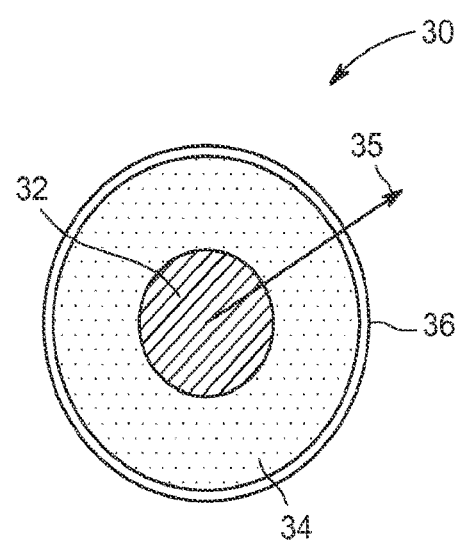
FIG. 2 is a cross-sectional view of an example magneto-caloric assembly, in accordance with aspects of the present disclosure.

FIG. 2 illustrates a cross-sectional view of an example magneto-caloric assembly 30. It should be noted that although in the illustrated embodiment the magneto-caloric assembly 30 has a circular cross-section, however, in other embodiments, the magneto-caloric assembly may have a regular or irregular shape and/or cross-section. In the illustrated embodiment, the magneto-caloric assembly 30 includes a first region 32, a second region 34 disposed on the first region 32, and a third region 36 disposed on the second region 34. In one embodiment, the first region 32 may include from about 40 volume percent to about 70 volume percent of a total volume of the magneto-caloric assembly 30. Furthermore, in another embodiment, the second region 34 may include about 10 volume percent to about 40 volume percent of the total volume of the magneto-caloric assembly 30. Moreover, in one embodiment, the third region 36 may include about 10 volume percent to about 30 volume percent of the total volume of the magneto-caloric assembly 30. Also, in one example, the first region 32 may include about 55 volume percent, the second region 34 may include about 25 volume percent, and the third region 36 may include about 20 volume percent of the total volume of the assembly 30.

The magneto-caloric assembly 30 is configured to accommodate at least a portion of a stress that may be produced during the magnetization process. If not accommodated, this stress may result in mechanical disintegration of the magneto-caloric materials. Hence, the magneto-caloric assembly 30 may be configured to act as a stress/strain tolerant assembly.

In certain embodiments, the first region 32 may include a first magneto-caloric material. In one embodiment, the first magneto-caloric material in the assembly 30 may be a single magneto-caloric material. Alternatively, in another embodiment, the first magneto-caloric material may be a combination of two or more different magneto-caloric materials. Non-limiting examples of the magneto-caloric materials may include Ni, Ag, Cu, carbon/graphite, $Gd_5(Si_xGe_{1-x})_4$, La(Fe,Co,Si)H, $La(Fe_xSi_{1-x})H_x$, NiCoMn(In,Ga,As), MnFeP(As,Si), $MnFeP_{1-x}As_x$, GdDy, GdTb, Gd(Ge,Sn)dSi, or combinations thereof. It may be noted that such thermally conductive and soft magnetic materials simultaneously enhance the permeability and thermal efficiency of a regenerator. In operation, a magnetic field such as the magnetic field 16 (see FIG. 1) may be applied to excite the magneto-caloric assembly, which in turn heats or cools the magneto-caloric material of the assembly 30. A fluid path is defined within the gap of individual magnetic-caloric assemblies to facilitate flow of a heat exchange fluid (not shown) and efficient thermal exchange between the heat exchange fluid and the magneto-caloric assembly 30.

In one embodiment, at least a portion of the second region 34 may include a magneto-caloric composite. In some embodiments, the magneto-caloric composite may be a combination of a second magneto-caloric material and a first matrix material. Moreover, in one embodiment, the magneto-caloric composite may be an effective corrosion resistant material that is configured to at least partly prevent degradation of the magneto-caloric material in the first region 32 of the regenerator. In one embodiment, the second region 34 may include a second magneto-caloric composite material having a second magneto-caloric material disposed in a polymer matrix. Also, in one embodiment, the first matrix material may include a polymer material that is configured to form a matrix around the second magneto-caloric materials.

The second magneto-caloric material may include one or more magneto-caloric materials. In one embodiment, a concentration of the second magneto-caloric material in the second region 34 may vary in a radial direction, generally represented by reference numeral 35. By way of example, the concentration of the second magneto-caloric material may be greatest close to the first region 32, and the concentration of the second magneto-caloric material may decrease with an increase in distance in the radial direction 35 away from the first region 32. Advantageously, presence of the second region 34 reduces the overall deadweight of the assembly 30 by increasing the overall volume percent of the magneto-caloric material in the assembly 30. In one embodiment, a volume percent of the second magneto-caloric material in the second region 34 may be in a range from about 30 percent to about 80 percent.

In certain embodiments, the second region 34 may be configured to provide at least in part thermal conduction and physical and chemical isolation between the magneto-caloric material of the first region 32 and the heat exchange fluid. Additionally, in certain embodiments, presence of the second region 34 prevents formation of hydroxides and other thermally insulating layers on the magneto-caloric material of the first region 32 when the assembly 30 is exposed to external environment. Such isolation of the magneto-caloric material of the first region 32 enhances chemical aspects of the magneto-caloric material and prevents reaction of the first magneto-caloric material with aqueous based and other reactive heat exchange fluids. Further, use of the polymeric material in the second region 34 may enhance strain tolerance of the magneto-caloric assembly to accommodate the strain arising due to magnetic cycling of the magneto-caloric material of the assembly 30.

Furthermore, in one embodiment, the magneto-caloric particles in the first region 32 and the second region 34 may be randomly aligned. However, during magnetization the magneto-caloric particles may tend to align in the direction of the magnetic field.

In some embodiments, the second magneto-caloric material may be a single magneto-caloric material or may be a combination of two or more different magneto-caloric materials. Non-limiting examples of the magneto-caloric materials may include Ni, Ag, Cu, carbon/graphite, $Gd_5(Si_xGe_{1-x})_4$, La(Fe,Co,Si)H, $La(Fe_xSi_{1-x})H_x$, NiCoMn(In,Ga,As), MnFeP(As,Si), $MnFeP_{1-x}As_x$, GdDy, GdTb, Gd(Ge,Sn)dSi, or combinations thereof. In one embodiment, the first and second magneto-caloric materials may be same. However, in another embodiment, the first and second magneto-caloric materials may be different materials.

In certain embodiments, the third region 36 may include a thermally conductive composite material. In some embodiments, at least a portion of the third region 36 may include a combination of a thermally conductive material and a carbon material to enhance thermal efficiency of the regenerator. Additionally, in some embodiments, the thermally conductive material may be a matrix material, where thermally conductive particles may be disposed in a polymer matrix. In one example, the third region 36 may include metallic particles disposed in a polymer matrix. Non-limiting examples of the thermally conductive composite material may include polymer composites of aluminum, aluminum nitride, copper based composites, or combinations thereof.

Furthermore, in one embodiment, a concentration of the thermally conductive material in the third region 36 may vary in the radial direction 35. In this embodiment, the concentration of the thermally conductive material may increase in the radial direction 35.

Moreover, in one embodiment, the third region 36 may be configured to act as a buffer layer between the first and second regions and the coolant, thereby preventing undesirable chemical interactions between the magneto-caloric materials of the first and second regions 32 and 34, respectively, and the coolant. Also, the third region 36 may be configured to prevent degradation of the first and second regions 32 and 34, respectively, by preventing the first and second regions 32 and 34, respectively, from being exposed to the coolant fluid. In one embodiment, the third region 36 may be a thermally conductive and chemically inert layer. By way of example, the third region 36 may be chemically inert towards the coolant. Hence, the third region 36 may minimize or prevent the formation of oxide or hydroxide layer.

In certain embodiments, the matrix material of the third region 36 may be same or different from the matrix material of the second region 34. The polymeric component of the magneto-caloric assembly 30, that is, the polymer materials of the second region 34 and the third region 36, may be configured to exhibit inherent corrosion resistance.

Furthermore, the size of the particles of the thermally conductive material may be in a range from about few nanometers to about few microns. In one embodiment, a volume percent of the thermally conductive material in the third region 36 may be in a range from about 30 percent to about 80 percent. Also, in one embodiment, the third region 36 may be formed by mixing desirable amounts of the polymeric component and the thermally conductive material together, followed by diluting the mixture with a solvent.

In certain embodiments, the thermally conductive particles may form a continuous network of the conductive particles. Incorporation of interconnected thermally conductive secondary particulates (of metal and metal alloy) having fine scale dimensions (ranging from nanometers to millimeters size), may provide enhanced thermal conductivity of the third region 36. The enhanced thermal conductivity of the third region 36 may facilitate greater heat transfer between the third region 36 and the coolant fluid.

Moreover, in some embodiments, the polymeric component of the second region 34, or the third region 36, or both may include a thermoplastic or a thermoset polymer. The polymeric component of the second region 34 and the third region 36 may be same or different. Use of the polymeric material in the second and third regions 34 and 36, respectively, may enhance strain tolerance of the magneto-caloric assembly 30 to accommodate the strain arising due to magnetic cycling of the magneto-caloric material of the assembly 30. Furthermore, since the polymeric material is elastic in nature, the combination of first, second and third regions 32, 34 and 36, respectively, may facilitate enhanced resistance to erosion due to rebounding effect while impinging on each other during operation. In particular, in case of a powder bed configuration, the combination of first, second and third regions 32, 34 and 36, respectively, may facilitate enhanced resistance to erosion due to rebounding effect while impinging on each other during operation. In certain embodiments, magneto-caloric assembly 30 may form a compliant structure, thereby preventing the structure from developing cracks.

Although not illustrated, in some embodiments, an intermediate region may be formed between the second region 34 and the third region 36. In some of these embodiments, at least a portion of the intermediate region may include both the second magneto-caloric material and the thermally conductive material.

In certain embodiments, the magneto-caloric assembly may be used in various types of regenerator structures, such as, but not limited to, double fin, open porous, foams, powder (e.g., powder in tube, powder bed), and parallel plate structures, and combinations thereof.

In one embodiment, a thickness of the magneto-caloric assembly 30 may vary based on the regenerator configuration. For example, in case of a powder bed configuration it may be desirable to have a coating of the magneto-caloric assembly 30 on each particle, in this case, the thickness of the magneto-caloric assembly 30 may be minimal to minimize the dead weight. On the contrary, if the regenerator structure is in a bulk form, such as but not limited to, a dual fin, a pin cluster, or a parallel plate, the thickness of the magneto caloric assembly 30 may be relatively more.

Figure 3:
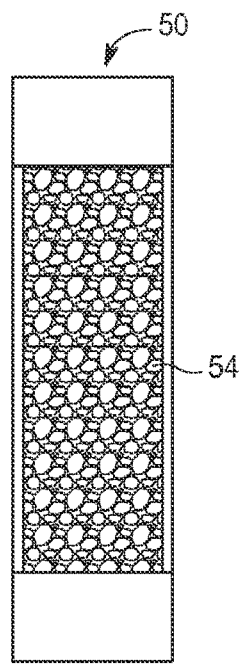
FIG. 3 is cross-sectional view of an example regenerator after being exposed to field cycling, in accordance with aspects of the present disclosure.

FIG. 3 illustrates an example regenerator 50 in a powder form. Conventional heat exchanger designs use a porous bed structure that have high pressure drop and are prone to erosion. If not accommodated, this stress may result in mechanical disintegration of the magneto-caloric materials. Typically, regenerators in powder form are susceptible to mechanical disintegration. This mechanical disintegration may result in clogging and reduced overall volume of the regenerator, thereby adversely affecting the functioning of the device.

Typically, in the presence of a coolant fluid, the magneto-caloric material in regenerators is subjected to corrosion during the AMR cycle. Corrosion of the magneto-caloric material may result in mechanical disintegration of the material. The mechanical disintegration of the magneto-caloric material may lead to full or partial loss of the magnetic properties of the magneto-caloric material. Advantageously, as illustrated in FIG. 3, the arrangement 50 may include a plurality of magneto-caloric assemblies 54. The arrangement 50 may be configured to retain its mechanical integrity even after several rounds of the AMR cycle in a coolant fluid. The assemblies 54 may act as a stress/strain tolerant coating that is configured to substantially retain the magnetic properties of the magneto-caloric material of the assemblies 54. In the illustrated embodiment, the magneto-caloric assemblies 54 may facilitate enhanced thermal and mechanical stability of the components. As illustrated, the magnetic-caloric assemblies 54 in a powder form regenerator 50 may retain most of its volume even after several rounds of the AMR cycle in a coolant fluid. In one embodiment, the size of assemblies 54 of the powder form regenerator before and after the cycling remains substantially the same. In addition, the total volume of the powder form regenerator 50 may remain substantially the same before and after the field cycling. Hence, the magneto-caloric assembly of the present application provides a regenerator with unexpectedly enhanced mechanical stability and corrosion resistance. The magneto-caloric assembly does not succumb to magneto-striction behavior typically associated with the magneto-caloric materials. The magneto-caloric assembly is flexible and is configured to accommodate volume expansion that is generated during the field cycling.

Figure 4:
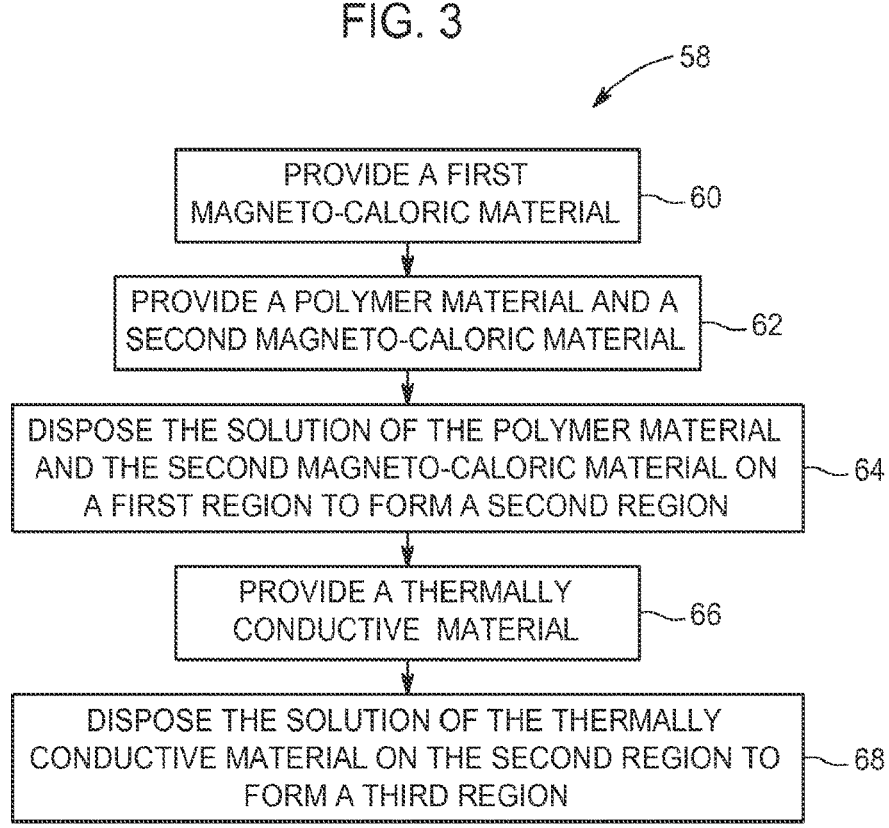
FIG. 4 is a block diagram of an example method of making a magneto-caloric assembly, in accordance with aspects of the present disclosure.
Figure 5:
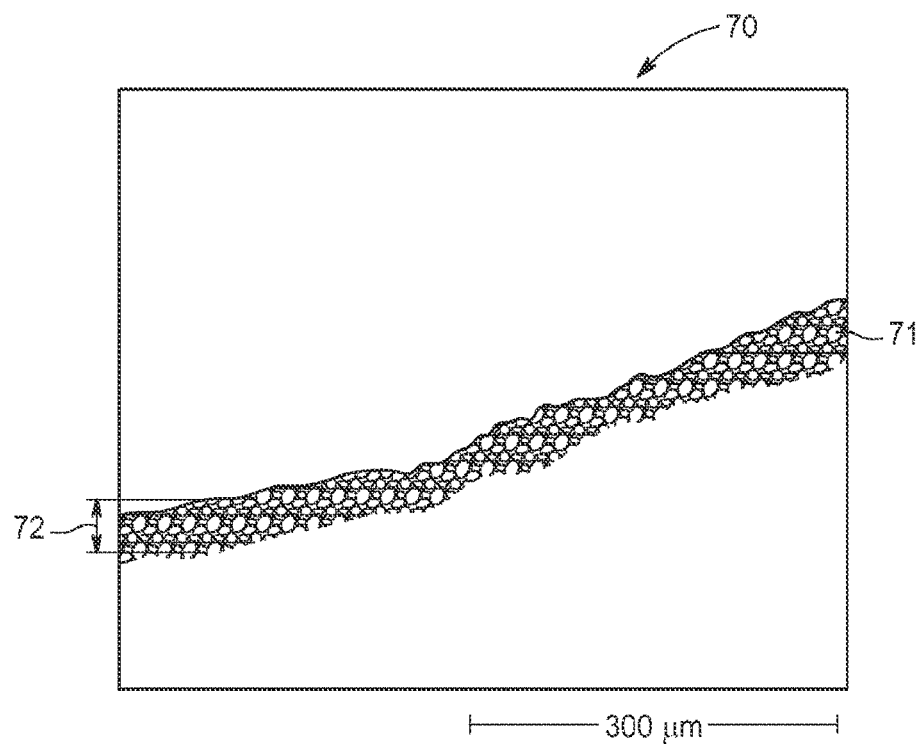
FIG. 5 is a schematic representation of an example scanning electron microscopy (SEM) image of a magneto-caloric assembly, in accordance with aspects of the present disclosure.

FIG. 4 illustrates an example block diagram 58 for a method of making a magneto-caloric assembly of the present application. At block 60, a first magneto-caloric material is provided. The magneto-caloric material may be provided in a powder form, or in the form of a plurality of shaped structures, such as, but not limited to, spheres, tubes, double fins, open pores, foams, or combinations thereof. Alternatively, the magneto-caloric material may be in a solid form, which may be crushed to provide a powder form. The first magneto-caloric material may define a first region.

At block 62, a polymer material and a second magneto-caloric material is provided. The polymer may include a thermoplastic or a thermoset polymer. A powder form of the second magneto-caloric material and the carbon based material may be mixed with a solvent to form a solution.

At block 64, the solution of the polymer material and the second magneto-caloric material may be disposed on at least a portion of the first region to define a second region. In one embodiment, the polymer material and the second magneto-caloric material may be disposed on the first region in the form of a coating.

At block 66, a thermally conductive material may be provided. The thermally conductive material may include a plurality of thermally conductive particles disposed in a polymer matrix. In one embodiment, the step of providing the thermally conductive material may include providing the plurality of thermally conductive particles and a polymer matrix separately, and mixing the plurality of thermally conductive particles and the polymer matrix using a solvent to form a solution. Non-limiting examples of the solvent may include isopropanol alcohol or acetone.

Furthermore, at block 68, the solution of the thermally conductive material may be disposed on at least a portion of the second region to define a third region. The solution of the thermally conductive material may be applied on the second region using vacuum or non-vacuum based techniques. The assembly including the first, second and third regions may be cured for a time period in a range of about 1 hour to about 12 hours to form the magneto-caloric assembly. In one embodiment, a curing temperature may be in a range from about 25° C. to about 150° C.

Several coating techniques, both vacuum and non-vacuum based, may be adopted to form the second region on the first region. Non-limiting examples of the coating techniques may include dip coating, solution spraying, spin coating or any other known coating techniques. By way of example, vacuum based techniques such as but not limited to, sputtering, non-vacuum techniques such as electroplating, or polymer based brush painting followed by curing may be used to form the second region, third region, or both second and third regions of the magneto-caloric assembly.
Experiment Magneto-caloric material made of LaFeSi is provided. The magneto-caloric material is dip coated using a thermally conductive coating made of a polymer composite of aluminum. The coating is dried at room temperature for about 12 hours. The coated magneto-caloric material is examined under a cross-section scanning electron microscopy (SEM), as illustrated in FIG. 4. The SEM image 70 illustrates that the coating 71 has an average coating thickness 72 of about 50 microns. The thermal conductivity of the coating 71 is about 0.72 W/m° K.

Figure 6:
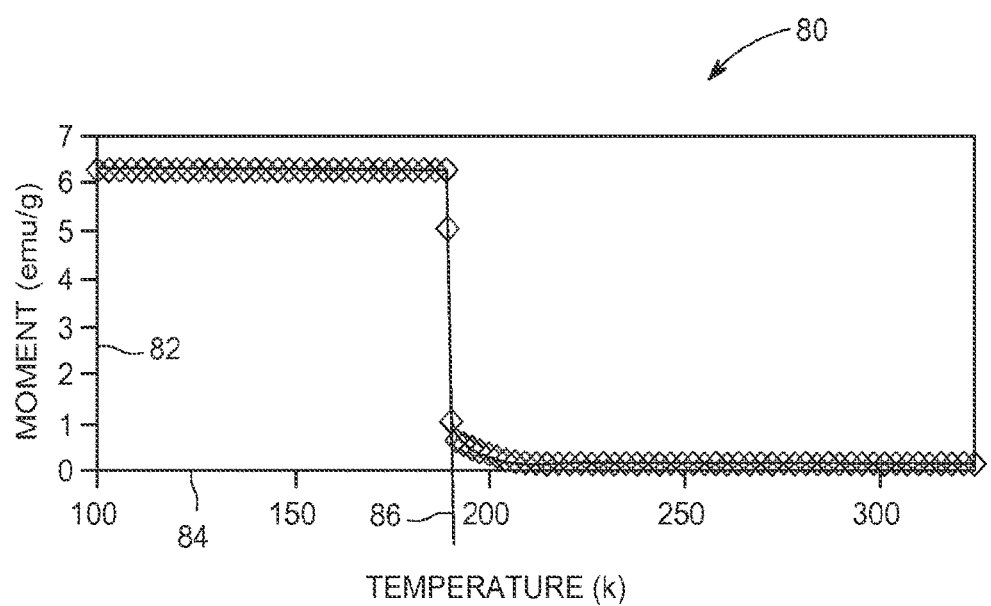
FIG. 6 is a graphical representation of magnetic moments (M) versus temperature of a magneto-caloric assembly, where the magneto-caloric assembly is exposed to a heat transfer fluid for an extended period of time.

Typically, after an extended period of exposure to coolant fluid during the AMR cycles, the magneto-caloric materials succumb to magneto-striction. Magneto-striction results in mechanical disintegration of the magneto-caloric material because of which the magneto-caloric material loses its magnetic properties. However, the magneto-caloric assembly of the present application unexpectedly retains the magnetic properties and mechanical integrity. Measurements are carried out to plot magnetic moment (M) of the coated particles with respect to temperature. Prior to carrying out the measurements, the coated particles are exposed to coolant fluid for a period of 6 months. The coolant fluid is deionized water. As illustrated in FIG. 6, a plot 80 of magnetic moments (ordinate 82) and temperature (abscissa 84) displays a sharp transition at the transition temperature ($T_c$) 86 of the coated magneto-caloric materials. The sharp transition at $T_c$ clearly shows that the material degradation due to corrosion in the heat transfer fluid i.e. water is inhibited by the coating surface. It is concluded that the magneto-caloric assembly unexpectedly prevents the material from corroding. Additionally, the magneto-caloric assembly unexpectedly prevents the material from corroding without compromising the magnetic properties of the magneto-caloric material in the assembly.

Advantageously, the magneto-caloric assembly of the present application may provide unexpected results by providing enhanced protection from chemical and mechanical degradation of the magneto-caloric materials of the magneto-caloric assembly. In particular, the present application may provide unexpected results by substantially preventing chemical and mechanical degradation of the magneto-caloric materials even upon interaction of the magneto-caloric assemblies with the coolant fluid. In certain embodiments, the magneto-caloric assembly may provide long term reliability of the magneto-caloric materials. Further, such magneto-caloric assemblies and regenerator structures using such magneto-caloric assemblies exhibit improved heat transfer efficiency. The thermally efficient regenerators reduce the amount of magneto-caloric material required to achieve the specific cooling rate and hence facilitates reduction in size, weight and cost of the overall magneto-caloric system. Effective permeability of the magneto-caloric regenerators is enhanced (despite lower permeability of the magneto-caloric materials) by such regenerator design and fabrication. Avoiding direct contact of heat transfer fluids and magneto-caloric materials by such regenerator designs minimizes oxide or hydroxide layer formation. Such structures further help achieve compact size, lower weight, are simpler in construction and hence economical to build.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A magneto-caloric assembly, comprising:
   a first region comprising a first magneto-caloric material;
   a second region disposed on the first region, the second region comprising
      a second magneto-caloric material, and
      a first matrix material comprising a polymer material within which the second magneto-caloric material is disposed; and
   a third region disposed on the second region and comprising a thermally conductive composite material, wherein the second region is located between the first region and the third region.

2. The magneto-caloric assembly of claim 1, wherein the first region is surrounded by the second region, and wherein the second region is surrounded by the third region.

3. The magneto-caloric assembly of claim 1, wherein a volume percent of the second magneto-caloric material in the second region is in a range from about 30 percent to about 80 percent.

4. The magneto-caloric assembly of claim 1, wherein the first and second magneto-caloric materials are same.

5. The magneto-caloric assembly of claim 1, wherein the thermally conductive composite material of the third region comprises thermally conductive particles disposed in a second matrix material.

6. The magneto-caloric assembly of claim 1, wherein the thermally conductive composite material of the third region comprises thermally conductive particles disposed in a polymer matrix.

7. The magneto-caloric assembly of claim 6, wherein at least a portion of the thermally conductive particles is interconnected.

8. The magneto-caloric assembly of claim 1, wherein the third region comprises metallic particles disposed in a polymer matrix.

9. The magneto-caloric assembly of claim 1, wherein the first matrix material comprises polymer composites of aluminum, aluminum nitride, copper based composites, or combinations thereof.

10. The magneto-caloric assembly of claim 1, wherein the first region comprises about 40 volume percent to about 70 volume percent of a total volume of the magneto-caloric assembly.

11. The magneto-caloric assembly of claim 1, wherein the second region comprises about 10 volume percent to about 40 volume percent of a total volume of the magneto-caloric assembly.

12. The magneto-caloric assembly of claim 1, wherein a concentration of the second magneto-caloric material in the second region varies in a radial direction.

13. The magneto-caloric assembly of claim 1, wherein a concentration of the thermally conductive material in the third region varies in a radial direction.

14. The magneto-caloric assembly of claim 1, further comprising an intermediate region disposed between the second region and the third region, wherein at least a portion of the intermediate region comprises the second magneto-caloric material and the thermally conductive composite material.

15. The magneto-caloric assembly of claim 1, wherein first magneto-caloric material comprises $Gd_5(Si_xGe_{1-x})_4$, $La(Fe_xSi_{1-x})H_x$, $MnP_{1-x}As_x$, GdDy, GdTb, or combinations thereof.

16. The magneto-caloric assembly of claim 1, wherein second magneto-caloric material comprises $Gd_5(Si_xGe_{1-x})_4$, $La(Fe_xSi_{1-x})_x$, $MnFeP_{1-x}As_x$, GdDy, GdTb, or combinations thereof.

17. The magneto-caloric assembly of claim 1, wherein the first matrix material comprises a thermostat polymer or a thermoplastic polymer.

* * * * *